Feb. 14, 1950 C. E. LOMAX 2,497,782

CONNECTOR SWITCH CONTROLLED FROM EITHER CALLING OR CALLED PARTY TO TRANSMIT DIFFERENT TYPES OF SIGNALING

Filed Sept. 15, 1945

INVENTOR.
CLARENCE E. LOMAX

BY

Chas. W. Condy

ATTORNEY

Patented Feb. 14, 1950 2,497,782

UNITED STATES PATENT OFFICE 2,497,782

CONNECTOR SWITCH CONTROLLED FROM EITHER CALLING OR CALLED PARTY TO TRANSMIT DIFFERENT TYPES OF SIGNALING

Clarence E. Lomax, Chicago, Ill., assignor to Automatic Electric Laboratories, Inc., Chicago, Ill., a corporation of Delaware Application September 15, 1945, Serial No. 616,616

25 Claims. (Cl. 179—18)

This invention relates to telephone systems in general but more particularly to automatic systems employing connector switches, selector and other types of switches for completing connections between calling and called subscribers.

One of the objects of this invention is the control of various types of ringing signals, which are provided to enable an executive or other official, to indicate to a staff member by the type of ringing signal which he hears on the ringer of his telephone, that he is being called by said official or executive.

Another object of this invention is the control of facilities for informing, by a suitable wanted signal, subscribers who are engaged on a connection that a connection to their line is desired by a superior officer or a more important call is waiting, such as a toll or long distance call, which should be given preference over a local call.

Another object of this invention is the control of various types of ringing facilities which are provided to give to called lines a ringing signal in accordance with the terminal arrangement of said lines and means for cancelling out the control by said terminal arrangement when the call is originated by a specific class of subscriber and substituting other means for the control of the ringing signal.

Another object of this invention is to arrange the telephone lines in groups, or on specific levels of the selecting switch, in such a manner that one group of lines will receive one type of ringing signal and another group will receive a different type of ringing signal.

Another object of this invention is to provide, in a connector switch circuit, a pick-up-relay which prevents a partial code or ringing signal from reaching the called line. The relay allows the ringing current to be connected to the called line only at the commencement of a code so that only a complete code can be transmitted to the called line.

The above objects and others are accomplished by providing new and simple features in the form of additions or alterations to well known types of automatic switches, also variations in bank terminal arrangements and ringing interrupter leads.

Certain advantages or objects are obtained by providing in the circuit of the well known connector, a relay which will be controlled either from the individual trunk selecting switch of specific classes of calling subscribers, such as executives' lines, or by the terminals of the called line. When this relay is controlled by a call originated by an executive's line, the said terminal facilities of the called line for controlling the type of ringing signal, are rendered ineffective and the control is from the calling line.

The control of the wanted signal is accomplished by providing a relay which can operate in series with, or in multiple with, the busy relay and is controlled by a call from an executive's line but not controlled by calls from, so called, ordinary subscribers' lines.

By arranging the lines in groups on the connector bank contacts, such as even and odd levels, or other groupings, the type of ringing signal is controlled by providing shaft springs which will operate on particular levels or in relation to certain bank contacts or groups of bank contacts, on a specified level or levels.

An instance of the advantages to be gained by the provision of some of the above mentioned features, would be in a large organization where it is necessary for the manager, or other executives, to frequently converse over the telephone with his staff members. The manager calls the number of the party with whom he wishes to speak and finds the line engaged. The calling executive will receive the regular busy signal and at the same time a distinct wanted signal will be transmitted to the wanted subscriber's line and the staff member will know that an executive is calling. The staff member will hang up his receiver to clear his line after which the connector switch will complete the connection and ring the bell of the staff member's telephone. The executive who has been camping on the previously busy line may now converse with his staff member with practically no loss of time and without being compelled to make a second call.

The invention in the specific form chosen for this illustration of the control of the ringing signal herein contemplates a relay in a connector circuit which may be operated from a calling executive's line or from the terminal of the called line, this relay governs the type of ringing signal which will be given to the called line. Another relay is used to accomplish the feature of "wanted signal" and "camp-on-busy."

The objects and features will be clearly understood from a perusal of the drawings, which consists of 5 figures on 1 sheet.

Figures 1, 2, 3, 4, 5:
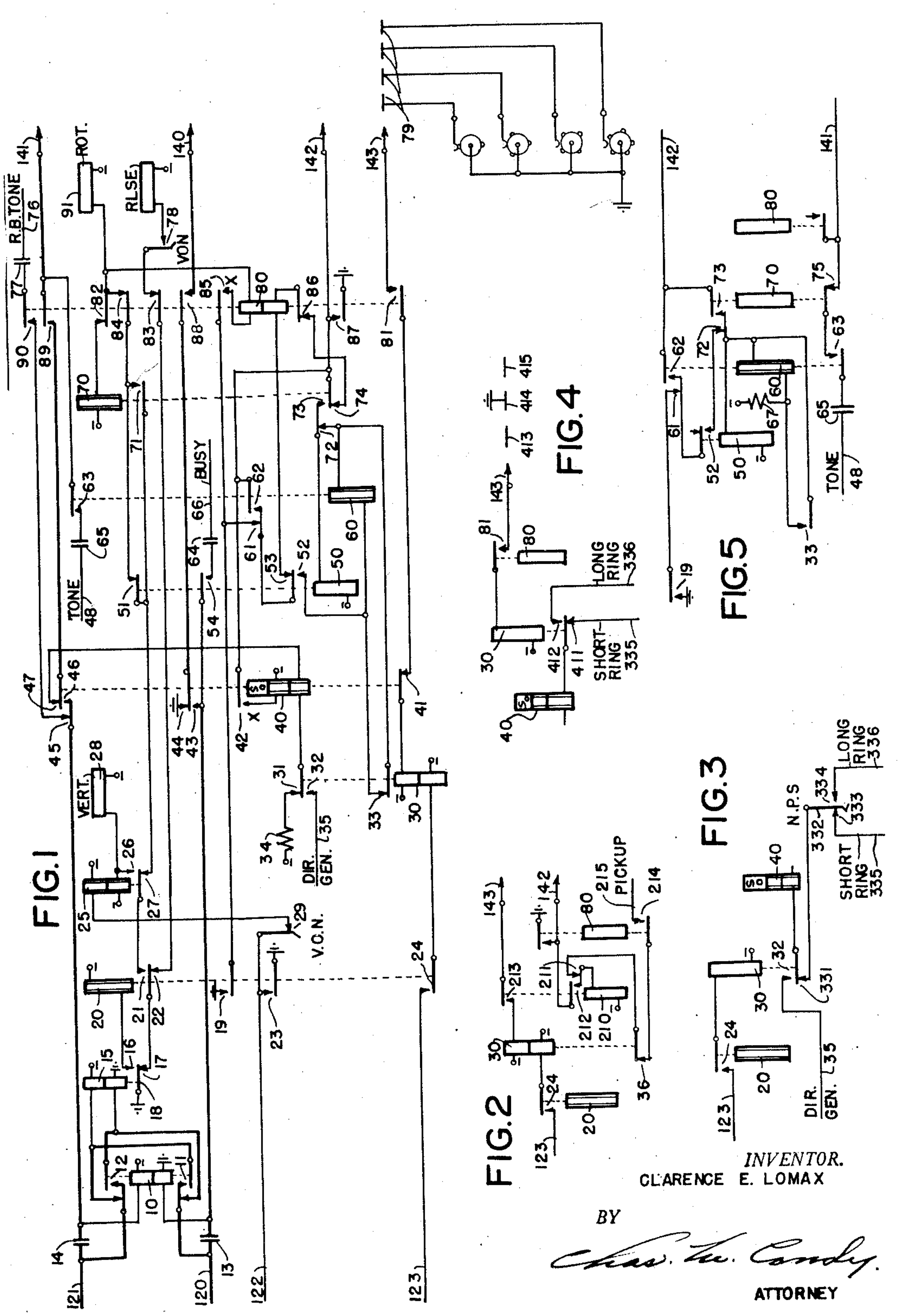
Figure 1 is the circuit of an ordinary connector but having a novel ringing signal control relay and a second relay for the control of the wanted signal and camp-on-busy feature.
Figure 2 shows an additional relay which can be included in this connector circuit to provide a pick-up feature to operate in connection with the ringing control relay.
Figure 3 shows a modified form of the ringing signal control feature of this connector circuit wherein shaft controlled springs are used.
Figure 4 shows a modified form of the ringing control feature of this connector circuit wherein the ringing signal may be controlled by current on a control bank contact associated with the line bank contacts of the called line.
Figure 5 shows another modification of this connector circuit to provide for the control of the wanted signal relay operating in multiple with the busy relay.

Referring now to the drawings, Figure 1 is a circuit of a connector of the well known type which responds to impulses from a calling dial to move its shaft and wipers vertically one to ten steps and one to ten steps horizontally to connect its incoming conductors 120 and 121 to the lines of the wanted subscriber. The two conductors of a calling subscriber's line, after entering the telephone office, are connected to an individual trunk selecting switch and may pass through one or more selector stages before reaching the connector of this invention. These switching stages and the switches involved therein are well known and therefore are not shown herein. It is sufficient to note that conductors 120 and 121 are connected to the calling station, and the impulses for building up the call, as well as the conversation takes place over this pair of conductors. Conductor 122 is the well known private conductor or holding conductor and conductor 123 is a special service conductor from the aforesaid individual trunk selecting switch through the one or more selecting stages, if there are selectors in the system, to relay 30 in the connector. In this invention conductor 123 is not brought into use when a call reaches this connector from an ordinary subscriber's line, however when a call originates at the station of a special class of subscriber, such as an executive, a ground (positive battery) is placed on this conductor 123 by the individual trunk selecting switch. This conductor 123, known as the executive control lead, passes through contact 24 on relay 20 to the winding of relay 30, therefore relay 30 will operate after relay 20 operates, on all calls from the lines of executives, or from special manual switchboards, such as toll or long distance boards, but will not operate when the connector is seized by an ordinary subscriber's line.

Having briefly described the invention as shown in the drawings, a detailed description of the operation will now be given.

For the first description we will assume that the subscriber who has made a call and whose telephone and line are now connected to conductors 120 and 121, is a so called ordinary subscriber. In this instance conductor 123 is not furnished with positive battery. The receiver and transmitter in series with the dial impulse springs are across the conductors 120 and 121, relay 15 operates and at contact 16 closes a circuit to operate relay 20, relay 20 operates and through contact 23 connects ground back over the private conductor 122, through the one or more selector stages, if there are selectors in the system, to the individual trunk selecting switch (not shown) associated with the calling line to hold the said selecting switch in its operated position. Contact 24 on relay 20 is also closed but has no effect because no potential is present on conductor 123. Contact 19 on relay 20 is also closed to furnish a ground to a part of the locking circuit of relay 80 also to contact 61 on relay 60 which, as explained later, furnishes ground for the operation of the busy relay 60. Contact 23, on relay 20, in addition to grounding the control conductor 122 to hold the individual trunk selecting switch, and other switches if any be in the circuit, furnishes ground through contact 29 of the vertical off normal spring combination to operate relay 25, relay 25 closes contact 26, but this has no effect at the moment as the circuit is open at contact 17. The calling subscriber now operates his dial, opening and closing the circuit of relay 15 in accordance with the digits of the called number. Armature 18 of relay 15 will follow the impulses from the dial and from ground through contacts 17, 21 and 26 will repeat these impulses to the vertical magnet 28 causing the shaft of this connector to be raised a number of steps in accordance with the number of impulses. Relays 20 and 25, being slow releasing, remain operated during the series of impulses. When armature 18 comes to rest operated, after the first series of impulses, relay 20 is again connected to ground through contact 16 and remains in operated position. Relay 25 however, restores to normal shortly after the complete series of impulses have been received into relay 15, and as contact 29 is now open due to the shaft being off normal, relay 25 restores, switching the impulsing circuit from the vertical to the rotary magnet 91 and relay 70. The second series of impulses will be received into the rotary magnet 91 and relay 70 in multiple. The rotary magnet 91 will cause the shaft to be rotated horizontally and relay 70 being slow releasing, will operate and remain operated throughout this second series of impulses. Relay 70 holds control conductor 142 connected through contact 73 to busy relay 50 and at the end of the series of impulses control wire 142 will be connected with the control wire of the wanted line. Should the called line be engaged, its control wire (not shown) will furnish ground to control wire 142 and through contact 73 on relay 70, which remains operated for a short time after the series of impulses which operated the rotary magnets, to busy relay 50. The busy relay 50 will operate, closing its contact 54 to connect the busy tone lead 66 through condenser 64 and condenser 13 to positive line 120, thus giving the busy signal to the calling subscriber. It should be noted at this point that the operation of relay 50, which takes place as soon as conductor 142 connects with ground on the control wire of the called busy line, closes a circuit at contact 52 which connects ground from contact 19, through 61, 52, 33 and contact 72 to relay 50 which forms a locking circuit preventing relay 50 from restoring and continuing to hold the busy tone on to the calling line, and this circuit will remain in this condition until released by the calling subscriber hanging up his receiver. It can be noted at this juncture that the winding of relay 60 is shunted by contact 33 and therefore does not operate at this time.

Now assuming that the called lines was not engaged at the moment conductor 142 connected with the control conductor of the called line, relay 50 would not be energized and as relay 70 would restore a short time after the last impulse of the series, control conductor 142 would be connected to one winding of relay 80 through contacts 74 and 86. Relay 80 operates over the following circuit: battery, through a relay (not shown) connected to the control lead of the called line, control lead 142 through contacts 74 and 86, through one winding of relay 80, contacts 53, 61 and 19 to ground, closing its contacts 81, 85, 87, 88, 89 and 90 and opening contacts 82, 83, 84 and 86. Contact 85 is part of a locking circuit and relay 80 will remain in operated position until contact 19 on relay 20 is opened, that is, after the calling subscriber hangs up his receiver. It is to be noted at this point that conductor 143 is connected to one of the contacts 79, each of which is associated with a called line, and these contacts will be furnished with various types of interrupted ground from an interrupter machine as indicated. Each time ground is supplied by the interrupter machine to conductor 143 through contacts 81 and 41 and through relay 30 to battery, relay 30 will operate, closing the ringing circuit from the direct generator lead 35 through contact 32, one winding of relay 40, contacts 47 and 89 to conductor 141. As the called telephone (not shown) is across the conductors 140 and 141, the ringing circuit will pass through conductor 141, the telephone ringer and its condenser, conductor 140, contact 88 to ground at contact 44. Thus the type of ringing signal given to the ringer of the called number will be dependent upon the type of ringing interrupter which is chosen for connection to the terminals of the called line. Contact 90 of relay 80 connects the ring-back tone lead 76 through condenser 77, contact 45, condenser 14 to conductor 121 and to the calling subscriber's telephone to advise the calling subscriber of the progress of his call.

Now, assuming that the calling party is an executive and that his telephone and line have been connected through his individual trunk selecting switch (not shown) to conductors 120 and 121. At the same time the control conductor from the individual selecting switch has been connected through the conductor 122 and, in this instance the executive control conductor 123 is now connected to ground at the selecting switch. As before, relay 15 operates and closes contact 16 to operate relay 20, relay 20 through contact 24 closes the circuit to operate relay 30. This relay 30 will remain operated for the duration of the connection and it will be noted that regardless of any ground or interrupted ground condition on the conductor 143 after the called line has been selected, it will have no effect on relay 30. In this manner, the control of relay 30, by the special conditions of the terminals of the calling line cause the control by the terminal facilities of the called line, which control the type of ringing signal to be given to the called line, to be rendered ineffective and a different type of ringing signal to be given. The executive proceeds with the call in the usual manner and assuming that the called line is not engaged when the last digit has been dialed, battery from the individual trunk selecting switch (not shown) of the called line over lead 142 will operate relay 80, closing the line circuit 140 and 141 at contacts 88 and 89 over which the ringing signal will be given, from direct generator lead 35, contact 32, one winding of relay 40, contacts 47 and 89, conductor 141, through the line and telephone of the called party, conductor 140, contacts 88 and 44 to ground. The continuous ringing signal will immediately indicate to the called subscriber that the calling party is an executive who requires prompt attention.

Should the line, which has been called by the executive, be engaged at the moment conductor 142 is connected to the control conductor of the called line, ground from the individual trunk selecting switch, over 142 will operate relay 50 and as soon as the slow releasing relay 70 drops back after the last dialed digit, contact 72 on relay 70 will close, completing a circuit, due to the opening of shunt springs 33 by relay 30, for the operation of relay 60 in series with relay 50 as follows: battery, winding of relay 50, contact 72, winding of relay 60, contacts 52, 61 and 19 to ground. As soon as the make-before-break spring combinations on relay 60 has operated, a holding ground for relays 50 and 60 is obtained from conductor 142 and these relays are no longer under the control of the ground connection at contact 19 on relay 20, therefore the release of relays 50 and 60 will now depend on the freeing of the called line. The operation of relay 60, explained above, closed one of its contacts 63 to connect a special wanted signal lead 48 through condenser 66, contact 63 to conductor 141. Although the called party's line is engaged, the distinctive wanted tone signal can be heard and the busy subscriber will know that an executive is wanting to establish a connection and therefore he will restore his receiver to free his line. The freeing of the called line will cause the ground potential to be removed from control conductor 142, which allows relays 50 and 60 to restore and another circuit is established, as follows: battery through a relay in the individual trunk selecting switch over conductor 142, contacts 74 and 86, one winding of relay 80, contacts 53, 61 and 19 to ground, operating relay 80. Now the same conditions prevail as when an executive calls a line which is not engaged, as previously explained and therefore the executive's call from this point onward will proceed in the usual way. The called subscriber's bell will receive a continuous ring and he will answer immediately, resulting in practically no delay to the executive although the line he called was engaged at the moment he first established the connection.

It was noted in the explanation above that relay 60 operated in series with relay 50, however the same functions may be accomplished by connecting relay 60 to battery through a suitable resistance, such as 67 in Figure 5 and operating it in multiple with relay 50. In this arrangement due to possible operation of relay 60 when passing busy contacts relay 70 is provided with a contact 75 as shown in Figure 5 which remains open during the operation of the rotary magnet and therefore assures that the wanted signal will not be communicated to lead 141 until the slow releasing relay 70 has restored, that is, a short time after the last impulse which operated the rotary magnet and relay 70 in multiple. In other respects the explanation is the same as previously given.

To provide for the pick-up feature, one relay is furnished in addition to those shown in Figure 1. This relay, 210 is wired into the circuit as shown in Figure 2. It will be noticed that when a call originates at an executive's telephone station, which as explained above, causes ground to be placed on lead 123, the pick-up feature will be ineffective due to the fact that the pick-up circuit will be open at contact 36 on relay 30. This contact 36 will be opened as soon as the call from the executive's line has been advanced to the connector of this invention and relays 15, 20 and 30 have operated and the circuit will remain open while this connector is used by an executive's line. It will be remembered from the above explanation, that a call from an executive's line causes relay 30 to operate to cause a continuous ring to be sent to the called line, therefore the pick-up service is not required.

However, when a call is made by an ordinary subscriber's line and the terminal facilities of the called line are the means for determining the type of ringing signal to be given the called line, then the pick-up feature is available to assure that a part of a ringing signal, for example, a part of a coded signal, will not be sent to the called line. The operation is as follows: an impulse of ground battery is applied to the pick-up lead 215 between each two code signals, by the ringing and ringing interrupter machine (not shown) and this impulse of current serves to operate relay 210, prior to which the interrupted ground from one of the contacts 79, in Figure 1, over lead 143 cannot operate relay 30 to start the ring, due to the circuit being open at contact 213. We will assume that the last impulse of the dialed number has caused leads 140, 141, 142 and 143 to be connected to the terminals of the called line, and that line is not engaged. This means that battery from the individual trunk selecting switch of the called line is connected over lead 142, which as explained above would serve to operate relay 80 and close a part of the ringing circuit. In this instance however the circuit to relay 30 is open at contact 213 on relay 210 and this relay must have an impulse of current over lead 215 before it can operate. Once operated it locks through one of the contacts 212, to the control conductor 142 and therefore will remain operated during the period of the connection. The impulse of current over lead 215, through contact 214, on relay 80 which is now operated, contacts 36 and 211, and the winding of relay 210 to battery, will operate this relay and, as previously stated, will lock through contact 212 to a ground connection on lead 142. As soon as relay 210 operates, contact 213 is closed completing the circuit to one winding of relay 30, which relay will now respond to whatever conditions are imposed by the facilities at the terminals of the called line over the lead 143, and the type of ringing signal will be in accordance with said facilities.

Figure 3 illustrates a modified form of the invention shown in Figure 1, showing a method of giving to the ringers of called lines, one of three types of ringing signal, that is, comparatively short intermittent or comparatively long intermittent or a continuous ring. It is explained as follows: when a call originates at the station of an executive, lead 123 as previously explained, will receive ground from the individual trunk selecting switch and the seizure of the line will operate relay 20 (in Figure 3), to close contact 24, whereby the ground on lead 123 will operate relay 30. Relay 30 operates to open contact 331 and close contact 32 which will connect continuous ringing lead 35 through one winding of ringing relay 40, as previously explained, to the called line, so that a call from an executive's station will cause a continuous ring on the ringer of the called number. However, when the call originates at an ordinary station, relay 30 does not operate and the control of the type of ringing signal to be given the called line is by the shaft springs, that is springs which will be operated by the shaft during its vertical or rotary movement. For example, if the tens digit in the called number is an odd figure, shaft spring 332 will not be operated and therefore the intermittent short rings from the ringing machine (not shown) will be received into this connector over lead 335, through contact 333, via spring 332, contact 331, one winding of ringing relay 40 to the called subscriber's line, as previously explained. Again, when the tens digit in the called number is an even figure, which means that the shaft would rise to one of the even levels, shaft spring 332 will be moved to the right (in Figure 3) contact 333 will open and contact 334 will close. Thus the type of ringing signal which would be given to a called line on an even numbered level, would be a comparatively long intermittent ring from ringing lead 336 via contacts 334 and 331, through one winding of relay 40 to the called subscriber's line in the usual manner. It will be noted by reference to Figure 3 that relay 30 is completely under control of that class of calling line, for instance an executive's line, in which the individual trunk selecting switch places ground on lead 123, which may be termed the executive control lead. The ring control relay 30 is therefore equipped with a single winding in the circuit in Figure 3, instead of two windings, as shown in Figures 1 and 2. Should a connector, using the wiring as per Figure 3, be seized by an ordinary subscriber's line, no ground would be placed on lead 123 by the individual trunk selecting switch, nor would the terminals of the called line determine the type of ringing signal to be sent to the called line, the type of ringing signal being entirely controlled by the number of the level to which the called line is connected. The terminals of the lines can be grouped in numerous ways and one group supplied with a comparatively short ring, while another group would be supplied with a comparatively long intermittent ring.

Figure 4 shows another form of control of the type of ringing signal by the terminals of the called line. It will be seen that in this arrangement after the last digit has been dialed and the wipers of the connector switch are resting on the terminals of the called line, lead 143 would be connected with one of the ringing signal control contacts 413, 414 or 415. The wiper control relay 80 operates in the usual manner to connect the calling and called lines together as illustrated in Figure 1 and described above. The operation of relay 80 closes contact 81 which connects lead 143 to the winding of relay 30. When there is no ground on the ringing signal control contact corresponding to the dialed number, such as 413 and 415, relay 30 will not operate and the called line will receive ringing current from ringing lead 335 which is a comparatively short intermittent ring. However, when the ringing signal control contact of the called line is grounded, such as contact 414, relay 30 will energize through contact 81 on relay 80. Relay 30 operates, closes its contact 412, thus connecting ringing lead 336, through one winding of the ringing relay 40, to the called line and said line will receive a relatively long intermittent ring. Other features of providing busy signal, ring-back-tone, etc., are the same as described above in connection with Figure 1.

Having described my invention, what I consider to be new and desire to have protected by Letters Patent will be pointed out in the appended claims.

What I claim as my invention is:

1. In an automatic telephone system, a plurality of classes of calling and called subscribers's lines, means for interconnecting said lines, ringing means in said connecting means, a ring control relay, circuit means for operating said relay in one manner dependent upon the class of said called subscriber's line in case the calling line is of a particular class, said ringing means controlled by the operation of said relay in said one manner to ring said called subscriber in a predetermined manner, additional circuit means for operating said relay in a different manner in case said calling line is of a different particular class independent of the class of said called line, and said ringing means controlled by the operation of said relay in said different manner to ring said called subscriber in a different predetermined manner.

2. In an automatic telephone system, a plurality of classes of subscribers' lines, a plurality of connector switches common to all classes of subscribers for interconnecting said lines, a ringing lead associated with said connector switch supplied with intermittent ringing current of short duration, a second ringing lead supplied with intermittent ringing current of long duration, ringing control contacts associated with each called line having different potentials thereon, a relay in said connector switch connected to one of said contacts when a line is called, said relay operated, when the contact connected with has certain potential, to switch the ringing circuit from the said first ringing lead to the said second ringing lead to give an intermittent long ringing signal to the called number.

3. In an automatic telephone system, a plurality of classes of calling and called subscribers' lines, a plurality of connector switches common to all classes of subscribers' lines, a conductor associated with each said subscriber's line, said lines and said conductors terminating on connector switch bank contacts for terminating calls, a relay in said connector switch controlled by current over the said conductor of a particular called line for causing a specific type of ringing signal to be given to said called line in accordance with the particular class to which said called subscriber's line had previously been assigned.

4. In an automatic telephone system, a plurality of classes of subscribers' lines, a conductor associated with each said subscriber's line, said lines and said conductors arranged in numerical order on banks of contacts, a plurality of connecting switches for connecting with said lines and said conductors through the said banks of contacts, a plurality of types of ringing interrupter leads attached to said contacts of said conductors in any desired manner, a relay in each connector switch responsive to impulses of current on said conductors to control the type of ringing signal to a called line, said types of interrupter leads associated with the said conductors of the said classes of subscribers' lines giving the type of interrupted ringing signal which has previously been assigned and associated with said called line.

5. In an automatic telephone system, a plurality of classes of subscribers' lines each with a corresponding ring control conductor, said lines and said conductors arranged in numerical order on the contacts of automatic switch banks, a plurality of connector switches for connecting with said lines and said conductors by access to said bank contacts, a plurality of ringing interrupters connected at will to said bank contacts over said conductors, a relay in each connector switch responsive to one of said interrupters for controlling the ringing signal to a called line in accordance with the type of ringing signal which has been previously selected and assigned to said called line as determined by the interrupter connected therewith, means in said connector switch controlled from a particular class of said calling subscriber's line for rendering ineffective the control of the ringing signal from the bank contact of the called line and giving to said called line a different type of ringing signal.

6. In an automatic telephone system, a plurality of classes of calling and called subscribers' lines, a plurality of connecting switches with means for interconnecting said calling and called subscribers' lines, said switches including a relay responsive to control from either the calling or called subscriber's line for determining the type of ringing signal to be given, a pick-up-relay in each connecting switch operated when certain types of ringing signals are given for preventing the ringing signal being given to the called line prior to the commencement of a complete code ringing signal.

7. In an automatic telephone system, a plurality of classes of subscribers' lines, a plurality of connecting means, a plurality of types of ringing signals, said connecting means including a relay responsive to control from the terminal facilities of the calling or the called subscriber's line to determine the type of ringing signal to be given and including a pick-up relay to prevent the ringing signal from being sent prior to the commencement of a complete ringing signal and means whereby said first relay, in response to a call from a particular class of subscriber, will operate to render ineffective the pick-up relay and apply a specific type of ringing signal to the called line.

8. In an automatic telephone system, a plurality of classes of subscribers' lines each with a corresponding ring control conductor, a plurality of connecting switches for interconnecting said lines, said switches available for use by all classes of subscribers' lines, a plurality of types of ringing signals, means in said connecting switches responsive to control over said ring control conductor of one class of subscriber's line for determining the type of ringing signal to be given and this same means effective when the calling line is of said particular class and when the called line is engaged for preventing the application of said ringing signal to the called line and for causing the transmission of a wanted signal to said busy line.

9. In an automatic telephone system, a plurality of classes of subscribers' lines each with a corresponding ring control conductor, a plurality of connecting switches for interconnecting said lines, said switches available for use by all classes of said subscribers' lines and including means responsive to control from the said ring control conductor of either the calling or called line for determining the type of ringing signal to be given the called line, this same means responsive when calling line is of a particular class for rendering ineffective the control of said means from said ring control conductors of called lines and for substituting a specific type of ringing signal to a called line, a second means, said first means effective when the called line is engaged for causing said second means to transmit a wanted signal to said engaged line.

10. In an automatic telephone system, a plurality of classes of subscribers' lines each with a corresponding ring control conductor, a plurality of connecting switches for interconnecting said subscribers' lines, a plurality of ringing signals, said connecting switches available for use by all classes of subscribers' lines and including means responsive to the control over said ring control conductors of either the calling or called line for determining the type of ringing signal to be given to a called line said means responsive to calls from a specific class of subscriber's line for rendering ineffective the control of said means over the ring control conductor of said called line, means effective when the called line is engaged for applying a wanted signal to said called engaged line, and means whereby said specific class of calling subscriber may remain connected to the called busy line until said line is freed and means responsive to the freeing of the said called line for disconnecting the wanted signal and giving immediately a predetermined type of ringing signal.

11. In an automatic telephone system, a plurality of classes of subscribers' lines, a busy signal, a wanted signal, a plurality of switches for interconnecting said calling and called lines, a relay in each of said switches, a shunt circuit around said relay normally rendering said relay inoperative, means for opening said shunt circuit only in case the calling line in an interconnection is of a particular class, means for operating said relay after its shunt circuit is opened in response to a busy connection to a called subscriber's line, said last means including a busy test means operative for connecting said busy signal to the calling line, a circuit for connecting said wanted signal to the called line completed in response to the operation of said relay, means for releasing said relay in response to the called line being freed, and means operative responsive to the release of said relay for connecting said calling line to said freed called line.

12. In an automatic telephone system, a plurality of classes of subscribers' lines, a plurality of connecting switches for the common use of all classes of subscribers for interconnecting said subscribers' lines, a plurality of types of ringing signals, a busy signal, a wanted signal, said connecting switches including a wiper control relay, a busy relay, a camping relay and a preferred service relay, said preferred service relay responsive when calls originate from one class of subscriber's line for causing one type of ringing signal to be given to a non-busy called line means effective in case said called line is busy for operating the said busy relay to connect the said busy signal to the calling line and for operating the said camping relay in case said preferred service relay is operated to cause the said wanted signal to be given to the said called busy line, means for first causing the said busy relay to release after the said called busy line is freed after which the said camping relay releases to cause the said wiper control relay to operate to connect the said calling line to the said called line and to connect said one type of said ringing signal thereto.

13. In an automatic telephone system, a connector switch for the interconnecting of a plurality of classes of subscribers' lines, a busy signal, a wanted signal, said connector including a busy relay, a camping relay and a special relay, said special relay responsive to calls from one class of subscriber's line and effective for operating said camping relay after operation of said busy relay for causing a wanted signal to be given to a called busy line, and means whereby said wanted signal means is rendered ineffective by the non-operation of said special relay when another said class of subscriber's line calls a busy line and said other calling line will receive the busy signal in response to the operation of said busy relay.

14. In an automatic telephone system, a plurality of connector switches for the common use of all classes of subscribers' lines, a busy signal, a wanted signal, each of said connector switches including a wiper control relay, a busy relay, a camping relay and a relay responsive to calls from one class of said subscriber's line to cause said wanted signal to be given to a called busy line, means effective when the said called line is busy whereby the said camping relay will be connected in series with the said busy relay, said camping relay then operating to connect the said wanted signal to the said busy called line, the said busy relay being the first to release when the said busy called line becomes free after which said camping relay releases to cause the said wiper control relay to connect said calling line with said called line.

15. In an automatic telephone system, a plurality of classes of subscribers' lines, automatic switches for extending connections from one of the lines to another, a busy relay, a wanted tone relay and a switching through relay, a class relay operated in response to a call from one class of subscriber's line for connecting the wanted tone relay in series with the busy relay, said last two relays operated when a seized called line is busy to connect a busy tone to the calling subscriber's line and a wanted tone to the called subscriber's line, means responsive to the freeing of the busy called line for first releasing the busy relay and then the wanted tone relay and means controlled by the release of said last relay to cause the operation of the switching through relay to connect the calling line to the called line.

16. In an automatic telephone system, a connector switch for the common use of all classes of subscribers' lines, a busy signal, a wanted signal, said connectors including a busy relay, a wiper control relay, a camping relay and a class relay responsive to control over either the calling or called subscriber's line, said class relay effective when calling subscriber's line is of one class and called line is busy for causing said busy relay and said camping relay to operate in series to connect said wanted signal to said called busy line and for causing the operated connector switch to camp on the said called busy line until said line is freed after which said wiper control relay is operated to make connection between said calling and called lines, said class relay effective when said calling line is of another class to shunt the said camping relay and render it inoperative and connect said busy signal to said calling subscriber.

17. In an automatic telephone system, a connector switch for the common use of a plurality of classes of subscribers' lines, a busy signal, a wanted signal, said connector including a busy relay, a camping relay and a relay responsive only to calls from one class of said subscribers' lines for causing the operation of said camping relay to cause said wanted signal to be given to a called busy line, means effective when the called line is busy whereby the said busy relay and said camping relay will operate in multiple to cause said wanted signal to be given to the said called busy line, means for preventing the wanted signal from being given to unwanted lines, and means whereby the said calling line will camp on the said called line and will be automatically connected therewith when said called line is freed.

18. In an automatic telephone system, a plurality of classes of subscribers' lines, means including connecting switches for interconnecting said lines, a plurality of ringing signals whereby said subscribers may be signalled by a series of intermittent short or intermittent long rings, said connecting switches including a shaft having a vertical motion, sets of contact springs actuated by said shaft when said shaft is moved vertically, means whereby one set of springs will be actuated when the shaft is moved vertically certain numbers of steps, means whereby another set of spring contacts will be actuated when said shaft is moved vertically different numbers of steps to cause specific types of ringing signals to be given to the called line whose terminals are associated with the respective steps.

19. In an automatic telephone system, a plurality of classes of subscribers' lines, each with a corresponding ring control conductor, means including connecting switches for interconnecting said lines, a plurality of ringing signals whereby said subscribers may be signaled by a series of intermittent short or intermittent long rings or a continuous ring, a relay in said connector switch responsive to current on the said ring control conductor of one class of subscriber's line, said connecting switch including a shaft having a vertical motion, sets of contact springs actuated by said shaft when shaft is moved vertically, means whereby one set of springs will be actuated when said shaft is moved vertically certain numbers of steps, means whereby another set of spring contacts will be actuated when said shaft is moved vertically different numbers of steps to cause specific types of ringing signals to be given to the called line whose terminals are associated with the respective steps, said relay operated from the said ring control conductor of said one class of subscriber's line to render the said shaft spring means ineffective and to give a different type of ringing signal to said called line.

20. In an automatic telephone system, a plurality of classes of subscribers' lines, a plurality of connector switches for interconnecting said lines, said lines arranged in numerical order on the bank contacts of said switches, a ring control bank contact associated with each said subscriber's set of line bank contacts, a relay in said connector, said relay operated when the said ring control contact of said called line is supplied with current for switching from one type of ringing signal to another type of ringing signal 21. In an automatic telephone system, a connector switch with means for interconnecting a plurality of classes of calling and called subscribers' lines, a pick-up lead supplied with intermittent current, a relay in said connecting means responsive to control from either the calling or called line in accordance with the class of line, a second or pick-up relay in said connecting means responsive to control from said pick-up lead, means in said connector switch effective only when calling line is of one class for causing the said pick-up relay to operate to prevent a partial code or ringing signal from reaching the called line.

22. In an automatic telephone system, a connector switch with means for interconnecting a plurality of classes of calling and called lines each with a corresponding ring control conductor, a pick-up lead supplied with intermittent current, a relay in said connecting means responsive to current from the said ring control conductor of either the said calling or called line, a second or pick-up relay in said connecting means responsive to current on said pick-up lead, means in said connector switch effective when said calling line is of a particular class to cause the said pick-up lead to be ineffective and to prevent the operation of the pick-up relay and to give a different type of ringing signal.

23. In a telephone system, a plurality of classes of subscribers' lines, each with a corresponding ring control conductor and an individual trunk selecting switch, a plurality of connecting switches, means for directively controlling one of said connecting switches over one of said lines to select and connect with another one of said lines, a double wound relay in said switch for controlling the type of ringing signal to be sent to said selected line, means in said connecting switch for operating said relay through one of its windings from current on said ring control conductor of one class of said subscriber's line through its said individual trunk selecting switch to give a continuous ringing signal to said called line, and means for controlling said relay over the other winding when another class of subscriber's line seizes the connector switch.

24. In an automatic telephone system, a plurality of classes of subscribers' lines, a plurality of connecting switches, a plurality of types of interrupter leads associated with the said subscribers' lines, means for directively controlling one of said connecting switches over one of said lines to select and connect with another one of said lines, a double wound relay in said connecting switch for controlling the type of ringing signal to be sent to a selected called line, means in said switch for operating said relay through one of its windings from interrupted current on said interrupted lead associated with the said selected called line to give a ringing signal in accordance with the type of signal previously chosen and assigned to said selected line, and means for controlling said relay over the other winding when a specific class of subscriber's line seizes the connector for rendering ineffective the control from the interrupter lead associated with the called line and to give a specific type of ringing signal.

25. In an automatic telephone system, a plurality of classes of subscribers' lines, a busy signal, a wanted signal, an automatic switch for interconnecting said calling and called lines, a busy relay and an auxiliary busy relay in said switch, means for operating said switch from a calling line to extend a connection to a called line, means for operating said busy relay alone in response to the extension of a call to a busy called line in case said calling line is of a particular class, a locking circuit for said busy relay completed independent of the called line, a circuit completed by said busy relay for connecting said busy signal to the calling line, means for operating said auxiliary relay in series with said busy relay in response to the extension of a call to a busy called line in case the calling line is of a different class, a circuit completed by said auxiliary busy relay for connecting said wanted signal to the called line, and a locking circuit for said busy auxiliary relay completed by the operation of said auxiliary busy relay dependent upon the busy condition of said called line.

CLARENCE E. LOMAX.

REFERENCES CITED

The following references are of record in the file of this patent:

UNITED STATES PATENTS

| Number | Name | Date |
|---|---|---|
| 1,278,330 | Goodrum | Sept. 10, 1918 |
| 1,459,860 | Powell | June 26, 1923 |
| 1,514,837 | Deakin | Nov. 11, 1924 |
| 1,556,751 | Benson | Oct. 12, 1925 |
| 1,685,547 | Lomax | Sept. 25, 1928 |
| 1,763,157 | King | June 10, 1930 |
| 1,925,681 | Uda | Sept. 5, 1933 |